United States Patent
Omori

(10) Patent No.: US 7,198,331 B2
(45) Date of Patent: Apr. 3, 2007

(54) ARMREST HEIGHT-ADJUSTING DEVICE

(75) Inventor: Misao Omori, Tochigi-ken (JP)

(73) Assignee: TS Tech Co. Ltd., Saitama Ken (JP)

( * ) Notice: Subject to any disclaimer, the term of this patent is extended or adjusted under 35 U.S.C. 154(b) by 0 days.

(21) Appl. No.: 10/540,851

(22) PCT Filed: Dec. 24, 2003

(86) PCT No.: PCT/JP03/16595

§ 371 (c)(1),
(2), (4) Date: Jun. 5, 2006

(87) PCT Pub. No.: WO2004/058009

PCT Pub. Date: Jul. 15, 2004

(65) Prior Publication Data

US 2006/0273647 A1 Dec. 7, 2006

(30) Foreign Application Priority Data

Dec. 26, 2002 (JP) .............................. 2002-378521

(51) Int. Cl.
*A47C 7/54* (2006.01)

(52) U.S. Cl. .............................. 297/411.32; 297/411.38

(58) Field of Classification Search ........... 297/411.32, 297/411.38, 411.39, 411.3
See application file for complete search history.

(56) References Cited

U.S. PATENT DOCUMENTS 6,050,645 A * 4/2000 Bradbury ................ 297/411.38
6,209,960 B1 * 4/2001 Bradbury ................ 297/411.35
6,467,847 B2 * 10/2002 Bidare .................... 297/411.32
6,578,922 B2 * 6/2003 Khedira et al. ......... 297/411.32
6,916,068 B2 * 7/2005 Kitamura et al. ......... 297/411.3

FOREIGN PATENT DOCUMENTS

| JP | 5 13253 | 2/1993 |
|---|---|---|
| JP | 2003-33252 A | 2/2003 |

\* cited by examiner

*Primary Examiner*—Peter R. Brown
(74) *Attorney, Agent, or Firm*—Browdy and Neimark, PLLC

(57) ABSTRACT

An armrest height-adjusting device has a collar (7) fixed to a seat back frame (5) and a spring (11). The spring (11) includes a coil portion (11A) provided on the outer periphery of the collar (7), a first leg portion (11B) engaging with the seat back frame (5), and a second leg portion (11C) received in a window portion (41) of the seat back frame (5). A diameter of the coil portion (11A) becomes short by the downward rotation of an arm frame (10) and becomes large by the upward rotation of the arm frame (10). The second leg portion (11C) is guided into the hook (21) by abutting against the window portion (41) when the arm frame (10) is rotated upward beyond a predetermined position. When the second leg portion (11C) is engaged with the hook (21), the diameter of the coil portion (11A) is kept in a state of becoming large.

2 Claims, 8 Drawing Sheets

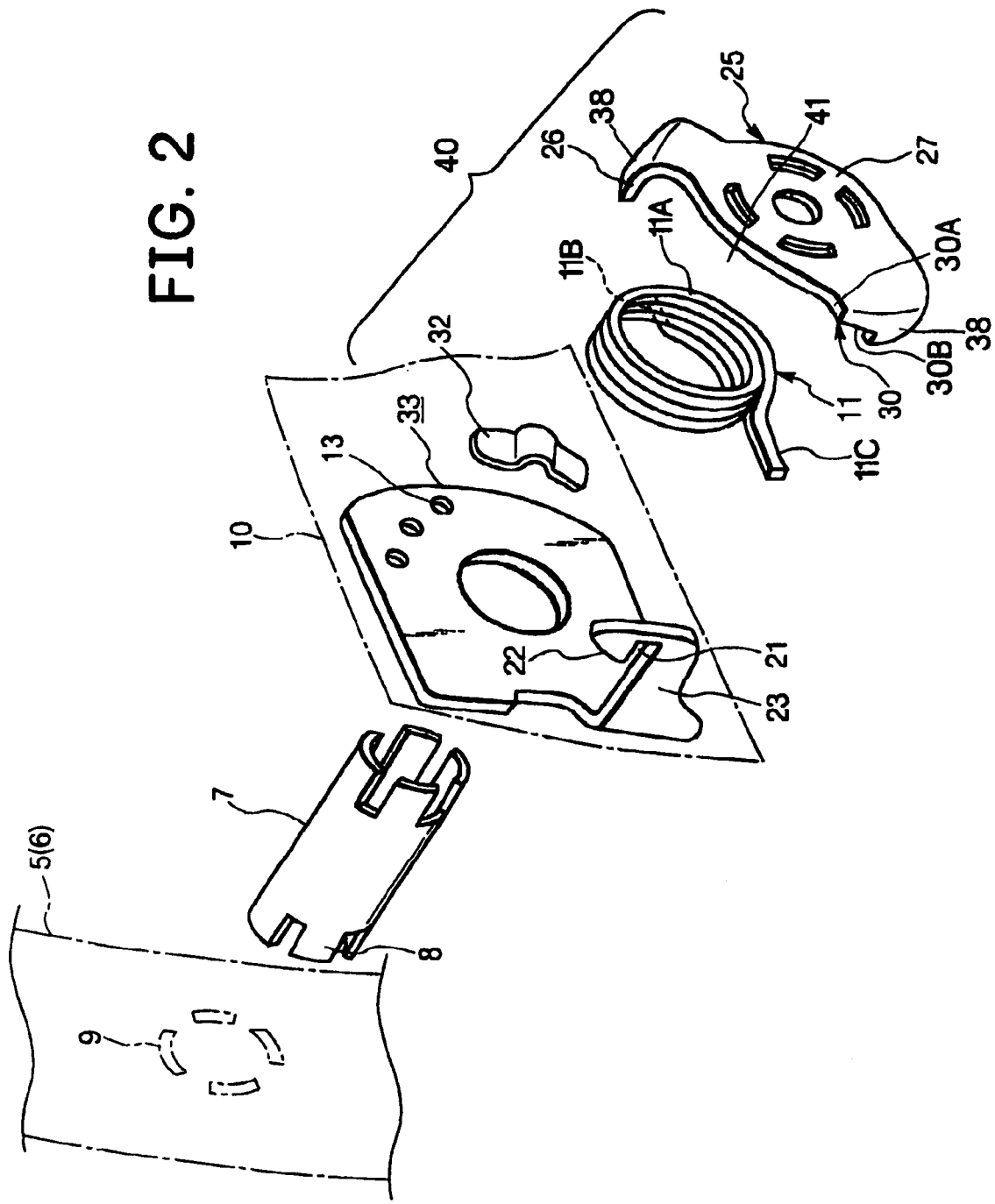

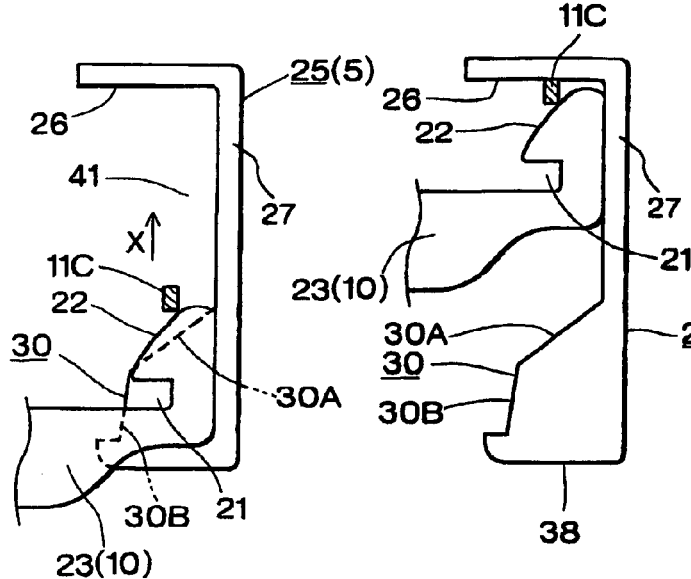
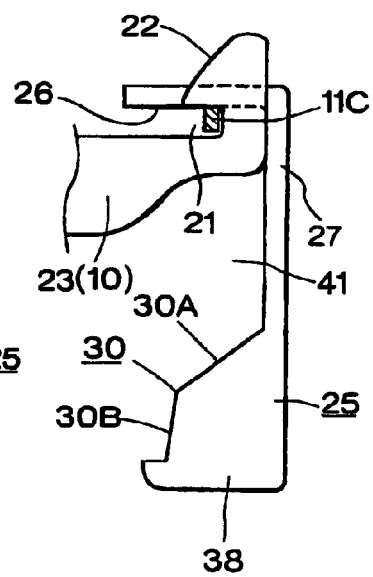
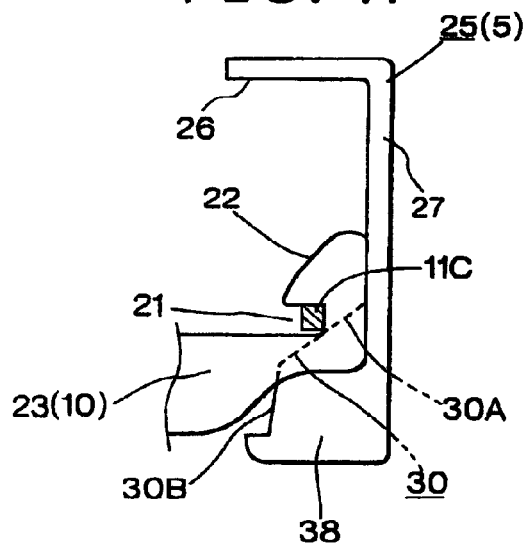
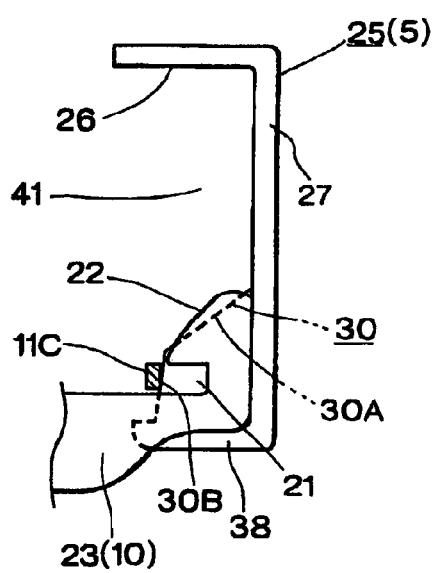

ARMREST HEIGHT-ADJUSTING DEVICE

TECHNICAL FIELD

The present invention relates to an armrest height-adjusting device of a vehicle seat.

BACKGROUND ART

Heretofore, in general, a height-adjusting device having a lock spring and a shaft disposed within a coil portion of the lock spring and holding an armrest at an arbitrary position by frictional resistance generated between the coil portion and the shaft has been publicly known (for example, Japanese Utility Model Application Laid-Open No. 5-53547).

The prior art device has been carrying a problem of requiring an operating lever to increase and decrease the frictional resistance between the coil portion and the shaft.

Further, the prior art device has caused trouble in the position adjustment method of the armrest.

DISCLOSURE OF THE INVENTION

An object of the present invention is to provide an armrest height-adjusting device, which does not require an operating lever.

Further, another object of the present invention is to provide an armrest height-adjusting device, which is simple in an operation method.

Further, another object of the present invention is to provide an armrest height-adjusting device, which can simply change a working range of the armrest.

BRIEF DESCRIPTION OF THE DRAWINGS

FIG. 2 is an exploded oblique view of a lock device of the height-adjusting device;

FIG. 14 is a schematic view showing the position of a straight leg portion of a lock spring when the armrest is at the lower limit position;

FIG. 15 is a schematic view showing the position of the straight leg portion when the armrest is at the top position of the working range;

FIG. 16 is a schematic view showing the position of the straight leg portion of the lock spring when the armrest is at the upper limit position;

FIG. 17 is a schematic view showing the position of the straight leg portion when the armrest moves from the lower limit position to the vicinity of the lower limit position; and FIG. 18 is a schematic view showing the position of the straight leg portion of the lock spring when the armrest moves from a state of FIG. 17 to the lower limit position.

BEST MODE FOR CARRYING OUT THE INVENTION

Figure 1:
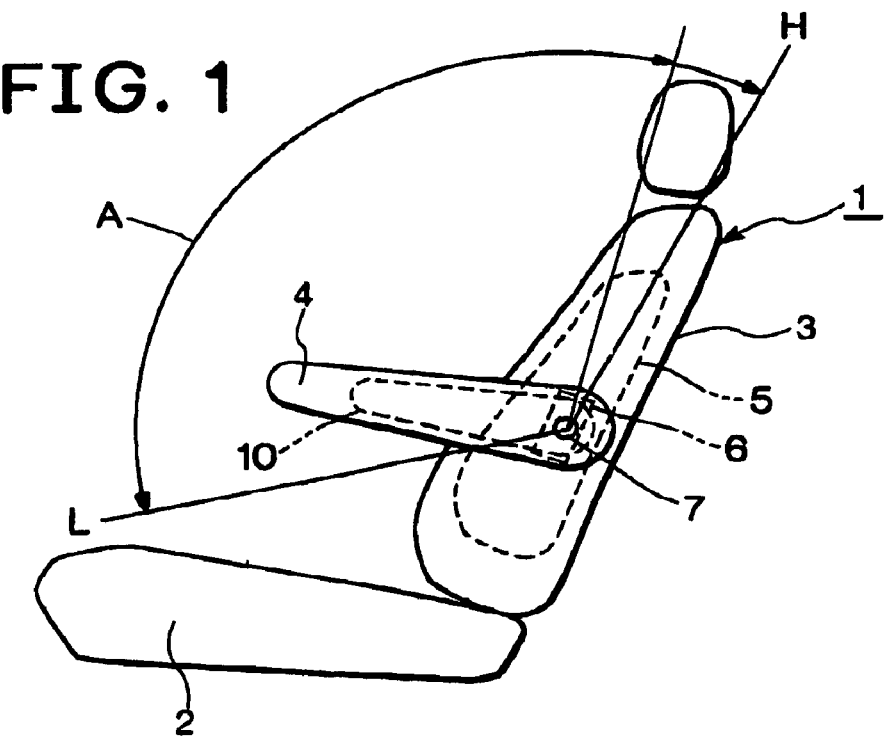
FIG. 1 is a side view of a vehicle seat comprising an armrest height-adjusting device according to the present invention.

An embodiment of the present invention will be described with reference to the drawings. A vehicle seat 1 according to the present invention has a seat bottom 2 slidably attached to a vehicle body (not shown), a reclining seat back 3 rotatably supported by the seat bottom 2, and an armrest 4 provided at the side portion of the seat back 3.

A seat back frame 5 of the seat back 3 is fixed with a bracket 6. A shaft 7 has an engaging portion 8 to engage with an engaging hole 9 of the bracket 6. An armrest frame 10 of the armrest 4 is fixed with an arm bracket 33. The armrest 10 is rotatably attached to the shaft 7. The other end of the shaft 7 penetrates the armrest frame 10 and the arm bracket 33, and extends laterally, and the circumference of the protruding portion of the shaft 7 is provided with a lock device 40.

The armrest 4, as shown in FIG. 1, is displaceable between a lower limit position L and an upper limit position H. The armrest 4 is usually used in a working range A. In the working range A, the armrest 4 is held at an arbitrary position by the lock device 40. That is, the displacement of the armrest 4 toward the lower limit position L is restricted by the lock device 40. However, the lock device 40 does not restrict the displacement of the armrest 4 toward the upper limit position H. The upper limit position H is used as a storage position of the armrest 4. The lock device 40 stops a locking function thereof when the armrest 4 is displaced into the upper limit position H, and allows the displacement of the armrest 4 toward the working range A from the upper limit position H. The locking function of the lock device 40 in the working range A is restored after the armrest 4 is substantially displaced into the lower limit position L.

The lock device 40 has a lock spring 11. A coil portion 11A of the spring 11 is disposed around the shaft 7. A first bent leg portion 11B of the lock spring 11 is engaged with an engaging hole 13 of the arm bracket 33. A second straight leg portion 11C is allowed to protrude long in the radial direction of the coil portion 11A. The coil portion 11A closely contacts the shaft 7 with adequate strength.

The end portion of the shaft 7 is fixed with a sprig cover 25. The spring cover 25 comprises a plate 27 orthogonal to the axial direction of the shaft 7, and a bent flange 38 extending toward the arm frame 10 from the outer peripheral edge of the plate 27. The bent flange 38 has a window portion 41 in which the second straight leg portion 11C is stored. One side surface of the window portion 41 is formed with an unlock abutting wall 26 approximately in parallel with the axial direction of the shaft 7, and the other side surface of the window portion 41 is formed with a return inclined wall 30. The return inclined wall 30 consists of a sharp inclined portion 30A and a gentle inclined portion 30B.

Figure 7:
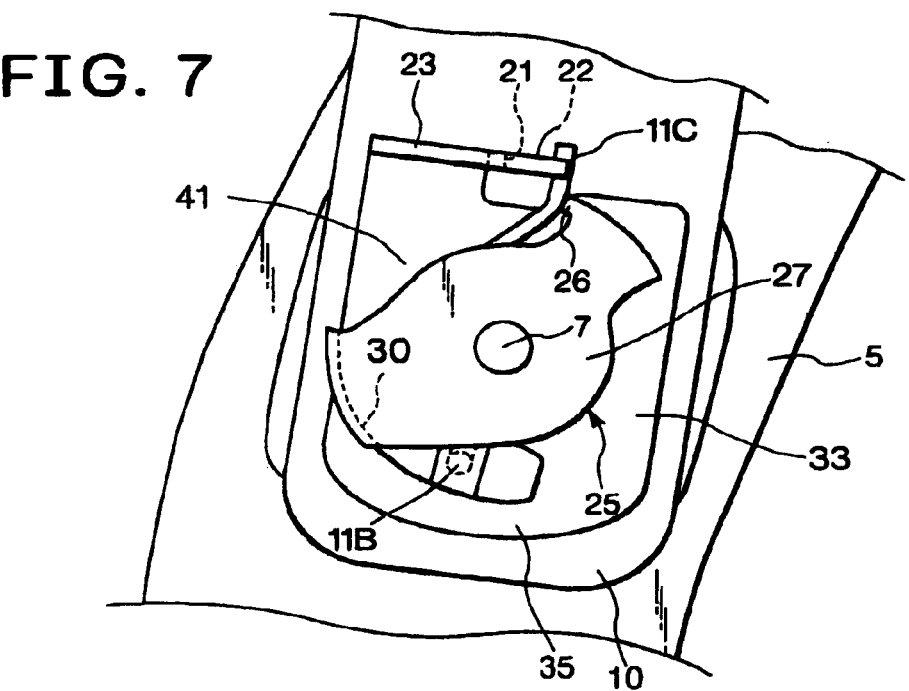
FIG. 7 is a side view of the lock device when the armrest is at the top position of a working range.
Figure 8:
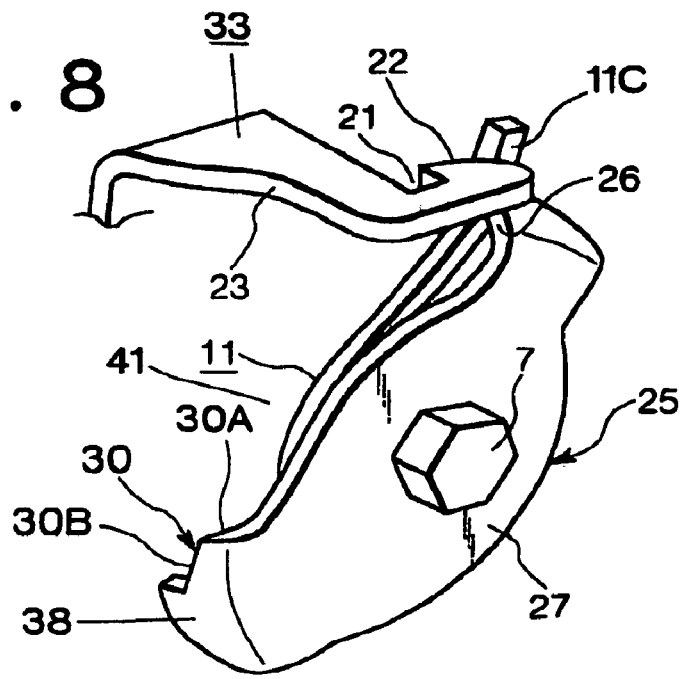
FIG. 8 is a side view of the lock device when the armrest is at the top position of the working range.

When the arm frame 10 is in the vicinity of the lower limit position L, as shown in FIGS. 3 to 5 and 14, the straight leg portion 11C is positioned in the vicinity of the inclined wall 30, and when the arm frame 10 moves to the top position in the working range A, as shown in FIGS. 7, 8 and 15, the straight leg portion 11C Just abuts against the unlock abutting wall 26. Consequently, when the arm frame 10 is positioned in the working range A, the straight leg portion 11C does not substantially abut against the spring cover 25, and the straight leg portion 11C is kept in a state in which whatever external force is not received.

When the straight leg portion 11C is in a state in which whatever external force is not received, the coil portion 11A closely contacts the shaft 7 with adequate strength. By the frictional resistance due to this contact, the armrest 4 is kept at an arbitrary position in the working range A. When the elbow of a driver and the like is mounted on the armrest 4 and the armrest 4 (shaft 7) tries to rotate downward, the coil portion 11A becomes short in diameter and strongly wounds around the shaft 7, so that the frictional resistance between the coil portion 11A and the shaft 7 is instantaneously increased. This increased frictional resistance prevents the downward rotation of the armrest 4. When the armrest 4 is rotated upward, the diameter of the coil portion 11A instantaneously becomes large, and the frictional resistance between the coil portion 11A and the shaft 7 is reduced, so that the armrest 4 can be smoothly rotated upward, and when rotation of the armrest 4 is stopped, the coil portion 11A closely contacts the shaft 7 again with adequate strength.

Figure 3:
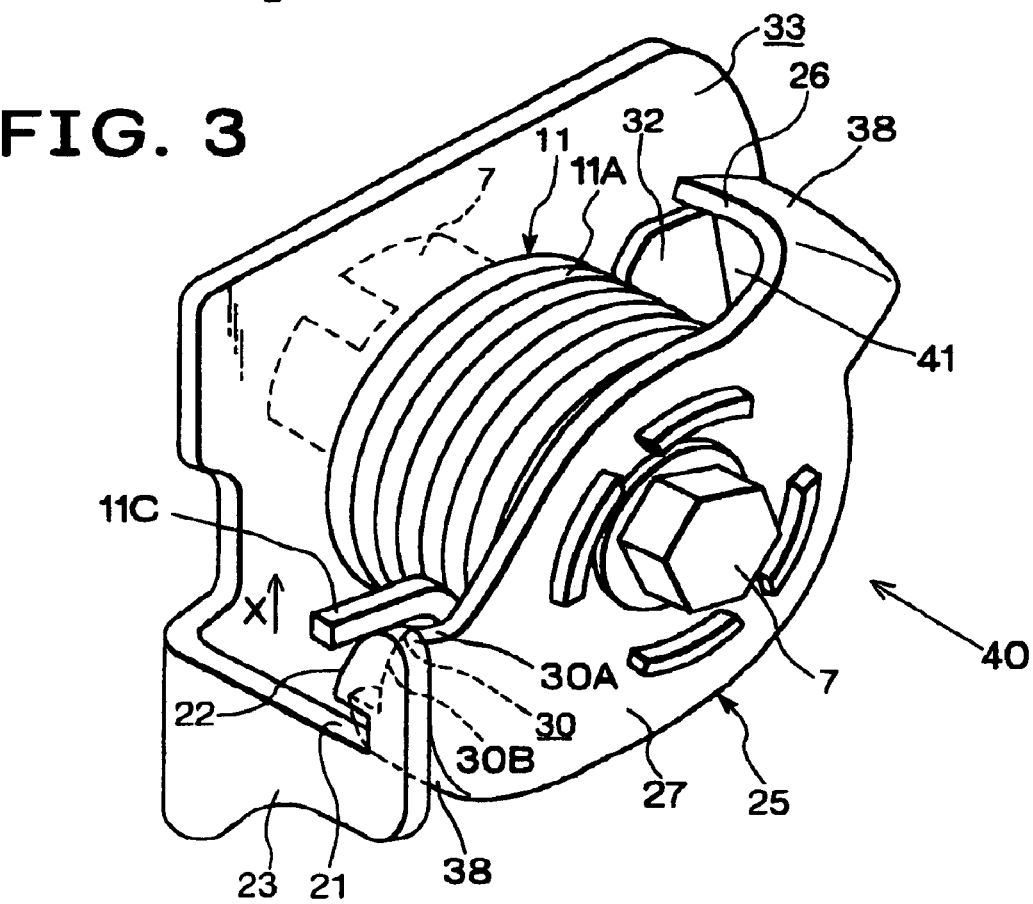
FIG. 3 is an oblique view of the look device when the armrest is at a lower limit position.

In FIGS. 3 and 14, when the straight leg portion 11C moves in the direction of an arrow X, the coil portion 11A becomes short in diameter, and when the straight leg portion 11A moves in the direction reverse to the arrow X, the coil portion 11A becomes large in diameter.

The arm bracket 33 has a bent plate 23 in parallel with the axial direction of the shaft 7, and the top end of the bent plate 23 is formed with a hook 21 capable of engaging with the straight leg portion 11C. The outer peripheral surface of the hook 21 is formed with an inclined guide cam surface 22 which guides the straight leg portion 11C into the hook 21. The straight leg portion 11C, when not receiving whatever external force, is positioned in the vicinity of the guide cam surface 22.

The end edge of the unlock abutting wall 26 of the spring cover 25 protrudes further to the arm frame side than the guide cam surface 22 of the hook 21.

Figure 4:
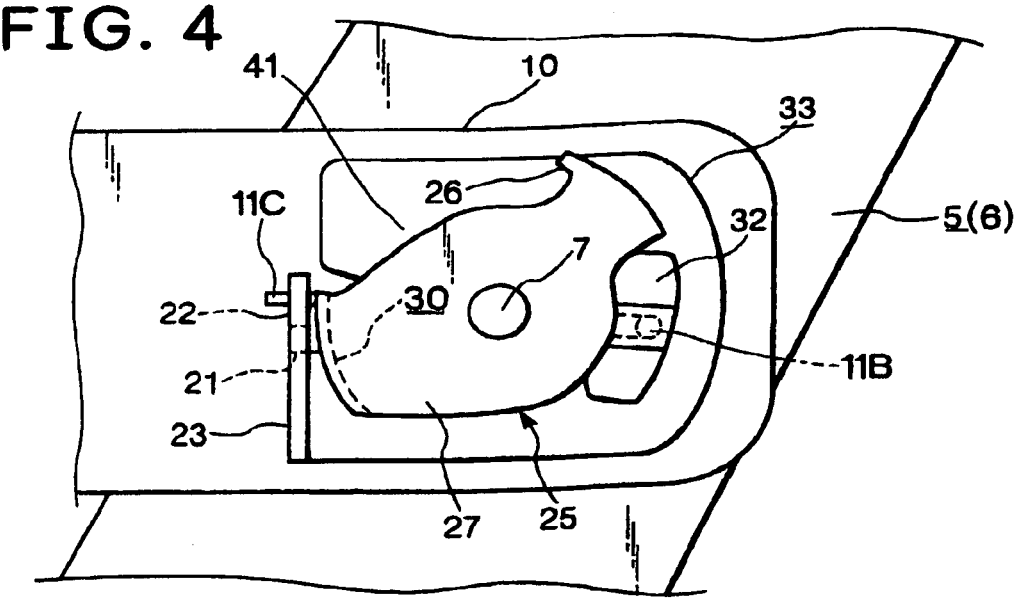
FIG. 4 is a side view of the lock device when the armrest is at the lower limit position.
Figure 5:
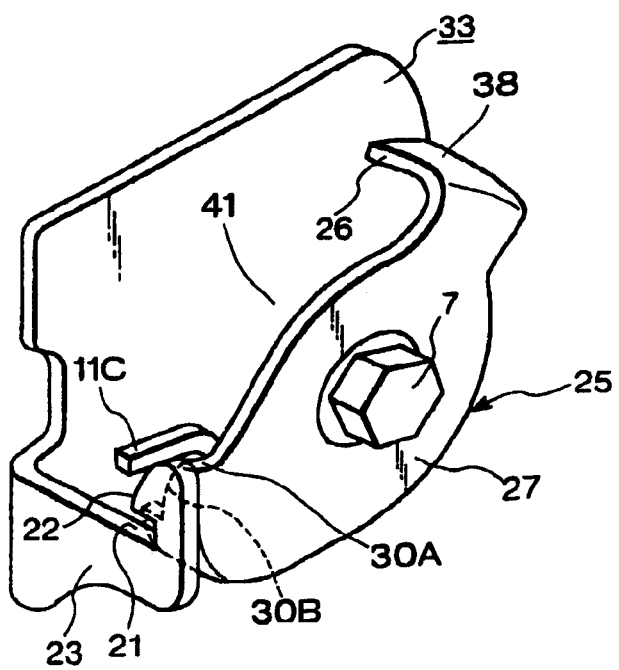
FIG. 5 is a schematic view of the lock device when the armrest is at the lower limit position.
Figure 6:
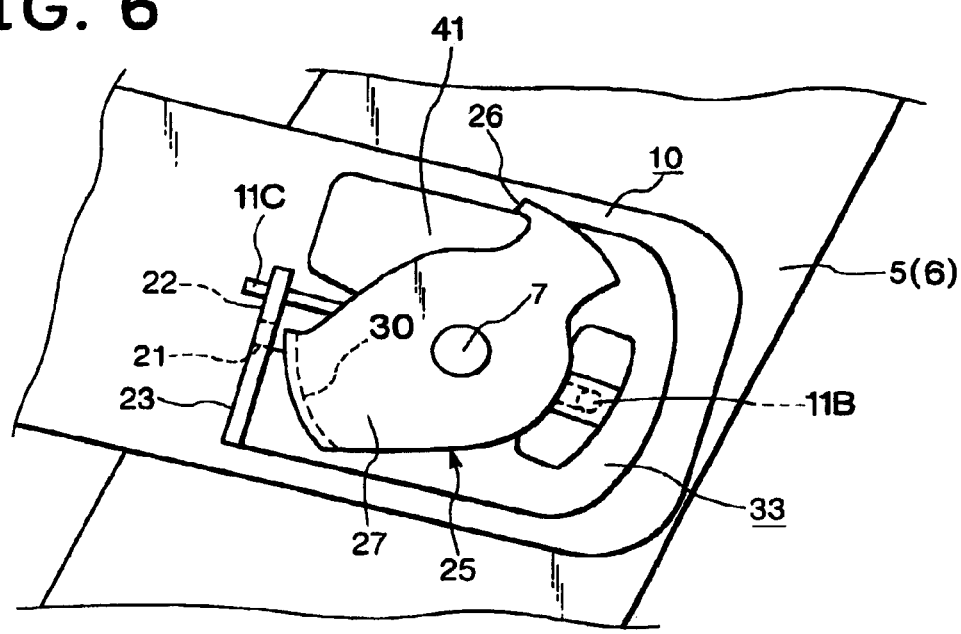
FIG. 6 is a side view of the lock device when the armrest slightly moves upward from the lower limit position.

When rotating the arm frame 10 upward from the states of FIGS. 3, 4 and 14, the diameter of the coil portion 11A becomes instantaneously large to reduce the frictional resistance between the coil portion 11A and the shaft 7, thereby assisting a smooth upward rotation of the armrest 4. When the armrest 4, as shown in FIGS. 7, 8 and 15, reaches the top position in the working range A, the straight leg portion 11C abuts against the unlock abutting wall 26, so that a direct external force acts upon the straight leg portion 11C for the first time.

Figure 9:
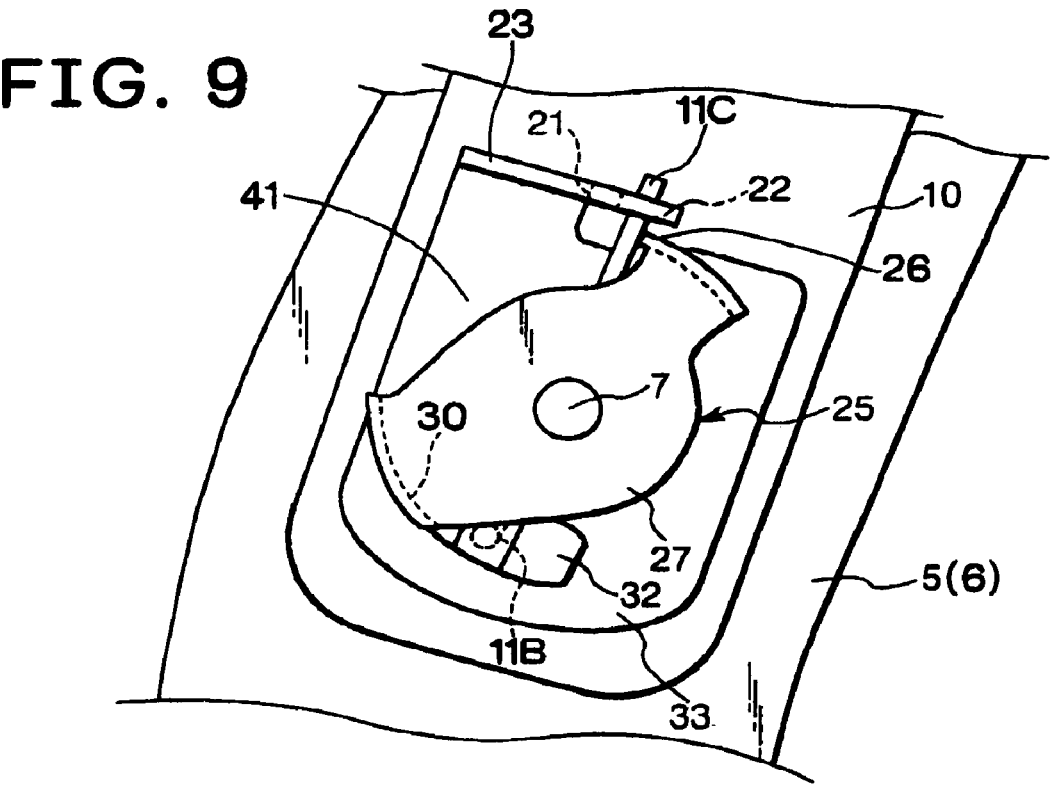
FIG. 9 is a side view of the lock device when the armrest slightly moves upward from the top position of the working range.
Figure 10:
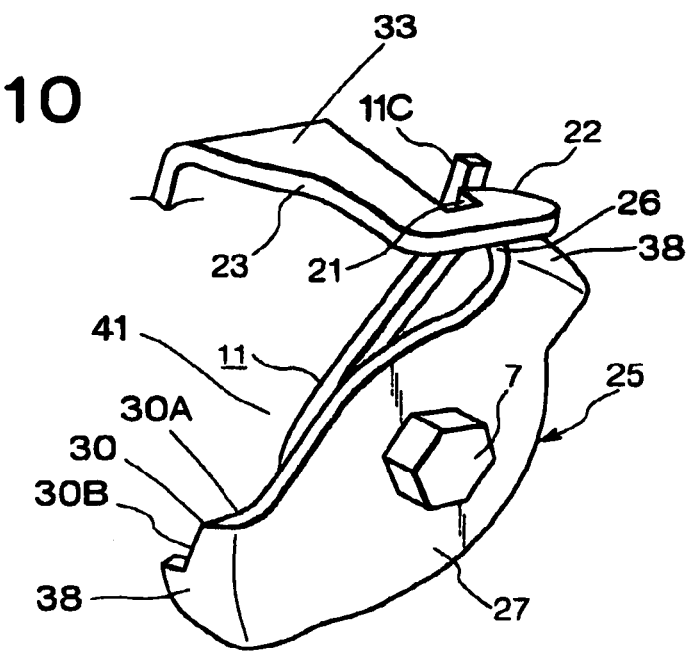
FIG. 10 is an oblique view of the lock device when the armrest slightly moves upward from the top position of the working range.
Figure 11:
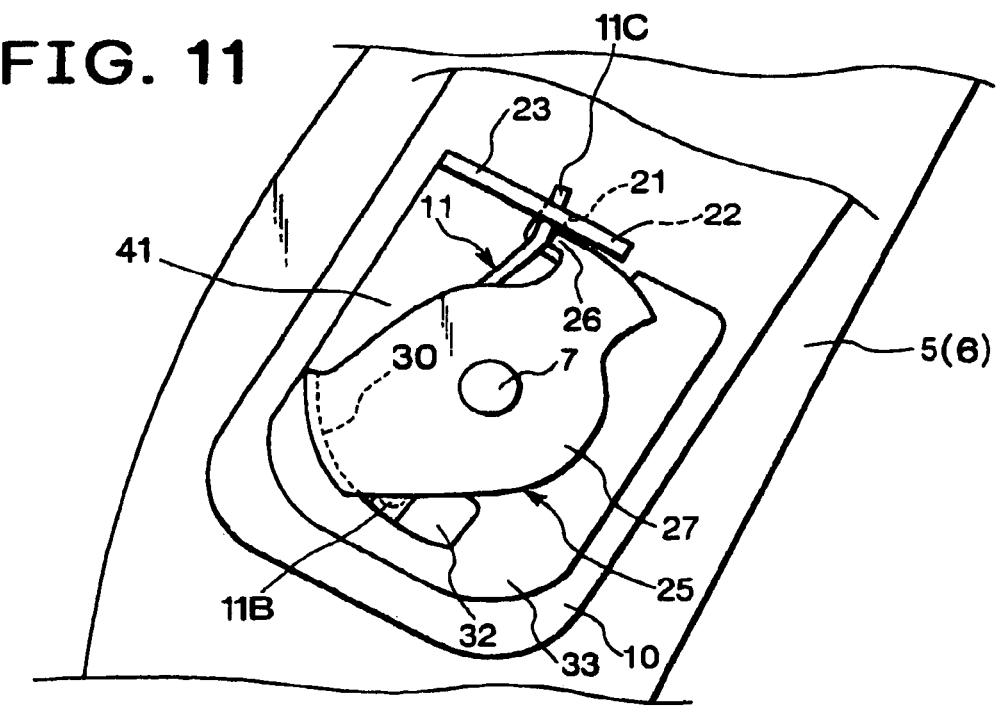
FIG. 11 is a side view of the lock device when the armrest is at an upper limit position.
Figure 12:
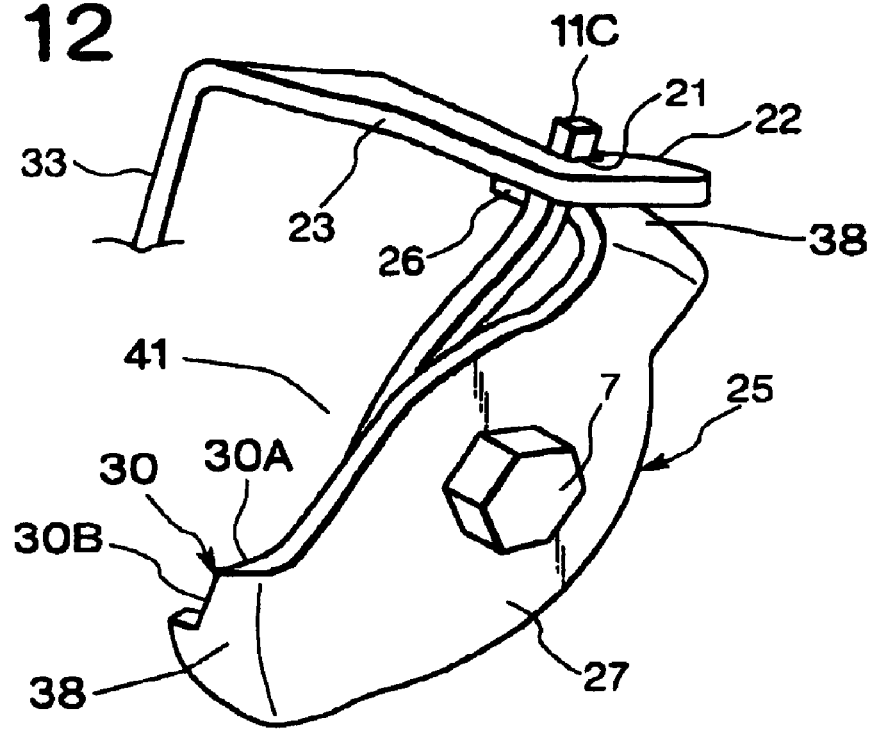
FIGS. 12 and 13 are side views of the lock device when the armrest is at the upper limit position.

When the armrest 4 further rotates upward in the states as shown in FIGS. 7 and 8, the straight leg portion 11C, as shown in FIGS. 9 and 10, is guided by the guide cam surface 22 of the hook 21 so as to move laterally, and after that, as shown in FIGS. 11, 12, and 16, the leg portion 11C is engaged with the hook 21, so that the armrest 4 reaches the upper limit position H.

In a state in which the straight leg portion 11C is engaged with the hook 21, the diameter of the coil portion 11A is kept in a state of becoming large. The frictional resistance at this time between the coil portion 11A and the shaft 7 becomes considerably small, and the armrest 4 can be rotated by a slight operational force.

Figure 13:
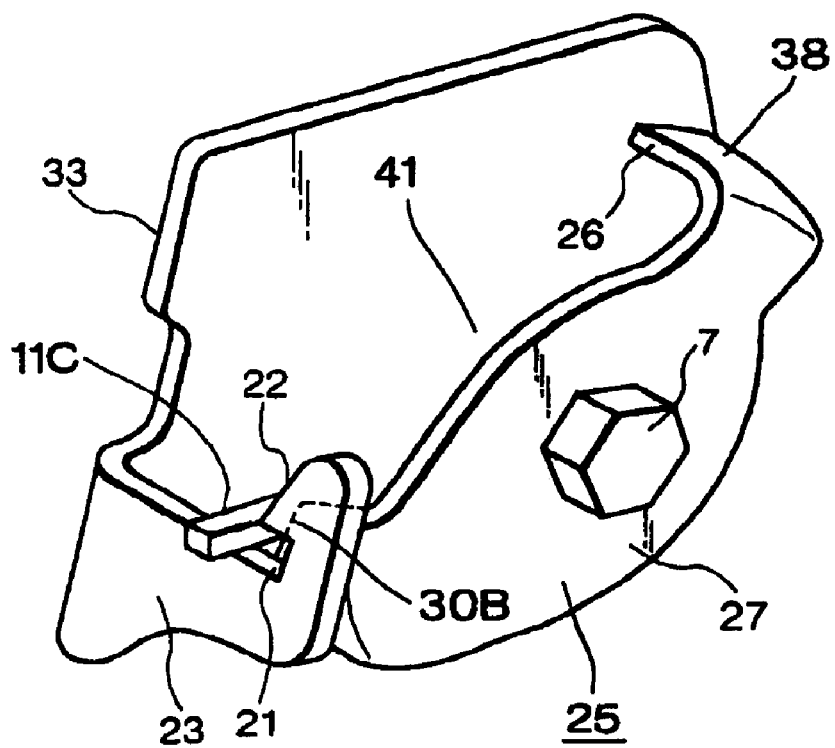

Even if the armrest 4 is rotated downward from the upper limit position H, the straight leg portion 11C is kept in a state engaged with the hook 21. Consequently, the armrest 4 can be rotated downward by a slight operational force. When the armrest 4 comes close to the lower limit position L passing through the working range A, as shown in FIG. 17, the straight leg portion 11C within the hook 21 abuts against the return inclined wall 30 of the spring cover 25, and this allows the straight leg portion 11C to slowly separate from the hook 21, and as shown in FIGS. 13 and 18, when the armrest 4 reaches the lower limit position L, the straight leg portion 11C is released from the hook 21. Then, the straight leg portion 11C, as shown in FIGS. 3 and 14, is returned to the initial position by elastic force of the coil portion 11A, and the frictional resistance between the coil portion 11A and the shaft 7 is also restored to the adequate strength, whereby the locking function in the working range A of the lock device 40 is restored.

The bracket 33 of the armrest frame 10 is fixed with a stopper 32, which controls a rotational range of the spring cover 25. The stopper 32 serves also as a function to prevent the first bent leg portion 11B from coming off.

EFFECT OF THE INVENTION

In the present invention, the structure is simple since the armrest 4 functions as an operating lever.

In the present invention, the width of the working range A of the armrest 4 can be simply changed through the change of the distance between the unlock abutting wall 26 of the spring cover 25 and the inclined wall 30.

In the present invention, when the armrest 4 is displaced from the upper limit position H toward the working range A, the frictional resistance between the coil portion 11A and the shaft 7 becomes considerably small so as to stop the locking function of the lock device 40, and therefore, the armrest 4 can be smoothly displaced till the lower limit L of the working range A.

The invention claimed is:

1. An armrest height-adjusting device of a vehicle seat having a seat bottom and a seat back rotatably attached to the seat bottom, comprising:

a collar fixed to a seat back frame of the seat back and rotatably supporting an arm frame of the armrest;

a spring cover integrally rotating with the collar;

a lock spring having a coil portion disposed around the collar, a first leg portion engaging with the seat back frame, and a second leg portion stored into a window portion of the spring cover; and a stationary plate fixed to the arm frame and having a hook capable of engaging with the second leg portion;

wherein the coil portion, in a state in which the second leg portion does not receive an external force, closely contacts the collar with adequate strength so as to generate an ordinary frictional resistance between the coil portion and the collar;

wherein, when the armrest is rotated downward, a diameter of the coil portion becomes short by the ordinary fractional resistance so as to increase the frictional resistance between the coil portion and the collar;

wherein, when the armrest is rotated upward, the diameter of the coil portion becomes large by the ordinary frictional resistance so as to reduce the frictional resistance between the coil portion and the collar;

wherein, the window portion has an unlock abutting wall for abutting against the second leg portion so as to guide the second leg portion into the hook when the armrest is rotated upward beyond a predetermined position;

wherein, the window portion further has a return inclined wall for abutting against the second leg portion so as to return the second leg portion to the inside of the window from the hook when the armrest is rotated downward in a state in which the second leg portion engages with the hook;

wherein the frictional resistance between the coil portion and the collar, in a state in which the second leg portion engages with the hook, is kept in a weaker state than the ordinary frictional resistance.

2. The armrest height-adjusting device according to claim 1, wherein the hook has an inclined guide cam surface to guide the second leg portion into the hook when the second leg portion is displaced by abutment with the unlock abutting wall.

* * * * *